United States Patent
Hull

(10) Patent No.: US 6,539,181 B2
(45) Date of Patent: Mar. 25, 2003

(54) JAM RECOVERY WHEN USING ORDERED MEDIA

(75) Inventor: Thomas R. Hull, Spencerport, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/772,383

(22) Filed: Jan. 29, 2001

(65) Prior Publication Data
US 2002/0102107 A1 Aug. 1, 2002

(51) Int. Cl.[7] .............................................. G03G 15/00
(52) U.S. Cl. ........................................... 399/19; 399/21
(58) Field of Search ............................... 399/19, 9, 21, 399/18

(56) References Cited

U.S. PATENT DOCUMENTS

| | | | |
|---|---|---|---|
| 3,886,329 A | 5/1975 | Kamiyama | 235/92 |
| 4,211,483 A | 7/1980 | Hannigan et al. | 355/14 |
| 4,521,102 A | 6/1985 | Motomura et al. | 355/14 |
| 4,568,172 A | 2/1986 | Acquaviva | 355/14 |
| 4,607,572 A | 8/1986 | Pou et al. | 101/426 |
| 4,624,452 A | 11/1986 | Pulskamp | 270/95 |
| 4,626,156 A | 12/1986 | Baughman | 412/33 |
| 4,739,865 A | 4/1988 | Yater et al. | 192/18 |
| 4,774,544 A | 9/1988 | Tsuchiya et al. | 355/14 |
| 4,782,363 A | 11/1988 | Britt et al. | 355/14 |
| 5,044,625 A | 9/1991 | Reid | 271/293 |
| 5,081,595 A | 1/1992 | Moreno et al. | 395/111 |
| 5,133,048 A | 7/1992 | Parsons et al. | 395/111 |
| 5,596,389 A | 1/1997 | Dumas et al. | 399/16 |
| 5,602,625 A * | 2/1997 | Okamoto et al. | 399/21 |
| 5,699,494 A | 12/1997 | Colbert et al. | 395/144 |
| 5,704,609 A | 1/1998 | Mandel et al. | 271/290 |
| 5,715,381 A | 2/1998 | Hamilton | 395/114 |
| 5,722,029 A * | 2/1998 | Tomidokoro et al. | 399/389 |
| 5,946,461 A | 8/1999 | Landry et al. | 395/117 |
| 6,026,258 A | 2/2000 | Fresk et al. | 399/87 |
| 6,134,568 A | 10/2000 | Tonkin | 707/526 |

FOREIGN PATENT DOCUMENTS

EP    0 479 494 B1    12/1997

OTHER PUBLICATIONS

Xerox Corporation, Xerox 9700 Laser Printing System Reference Manual, 1985, pp. 4–42, 4–43, 6–12 and 6–14 (600P87622).
Manual, Adobe® "Portable Document Formal Reference Manual, Version 1.3," pp. 2–518.
"Adobe® Acrobat 4.0 Guide," pp. 1–595.
Brochure, "Quite Imposing Plus Online Guide 1.2."
Brochure, "W3C Extensible Markup Language (XML) 1.0," W3C Recommendation Feb. 10, 1998, pp. 1–32.

(List continued on next page.)

*Primary Examiner*—Quana M. Grainger

(57) ABSTRACT

A printing system comprises at least one input source for storing a medium prior to printing or otherwise operating on the medium and a second input source to store at least one set of an ordered media comprising a plurality of sheets having different physical characteristics. A central processing unit stores a graphical representation of the set of ordered media. Upon the occurrence of a jam in the printing system, the central processing unit determines which sheet of the set of ordered media is the correct one to recover to. The central processing unit generates a graphical representation indicating the correct sheet of the set of ordered media to be recovered to and displays the representation on a display for the operator.

8 Claims, 14 Drawing Sheets

OTHER PUBLICATIONS

Brochure, "StampPDF™ Users Guide—An Acrobat Plugin," pp. i–lxxxviii, © 1999 Digital Applications, Inc.
Brochure, "TIFF™ Revision 6.0 " Specification, pp. 1–121.
Manual, "TWAIN Specification Version 1.8," pp. I—B–516.
Manual, "Open Document Management API, Version 2.0," pp. 1–87.
Brochure Guide, "Network Imaging System interface Development Guide, Release 2," pp. i—I–6.
Dan Phelps and John Thompson, "Rendering For Electronic Printers and Copiers," pp. 1–72.
Kodak Publication No. FN9074 5/85—"Fundamentals of Digital Copiers —Revision 1,"pp. 1–49.

* cited by examiner

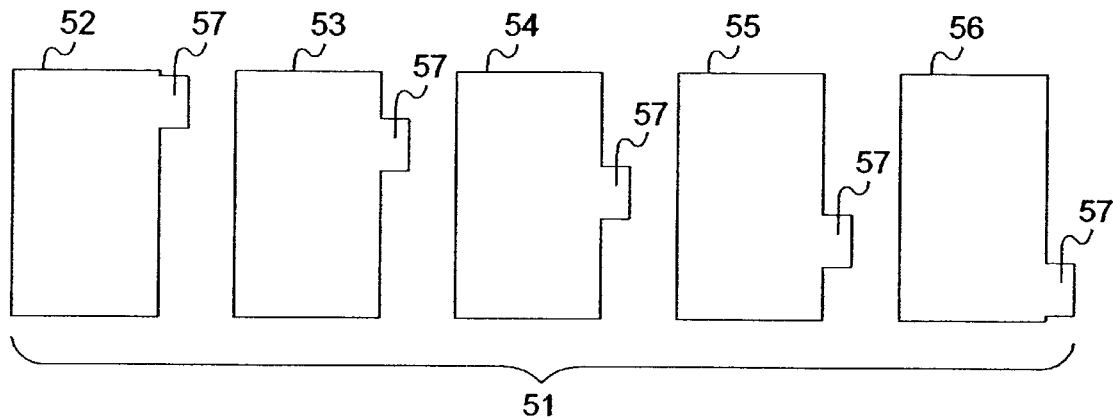
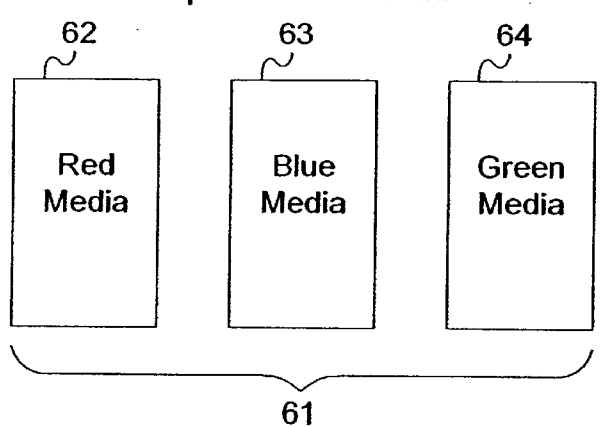
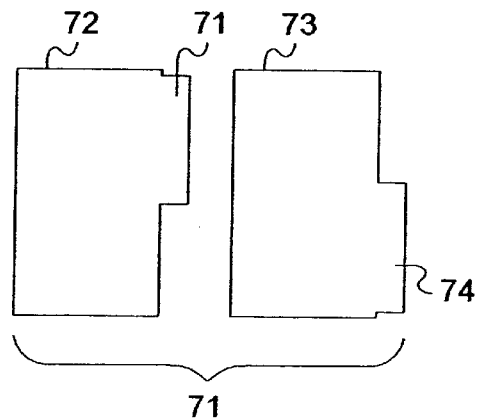
FIG. 4

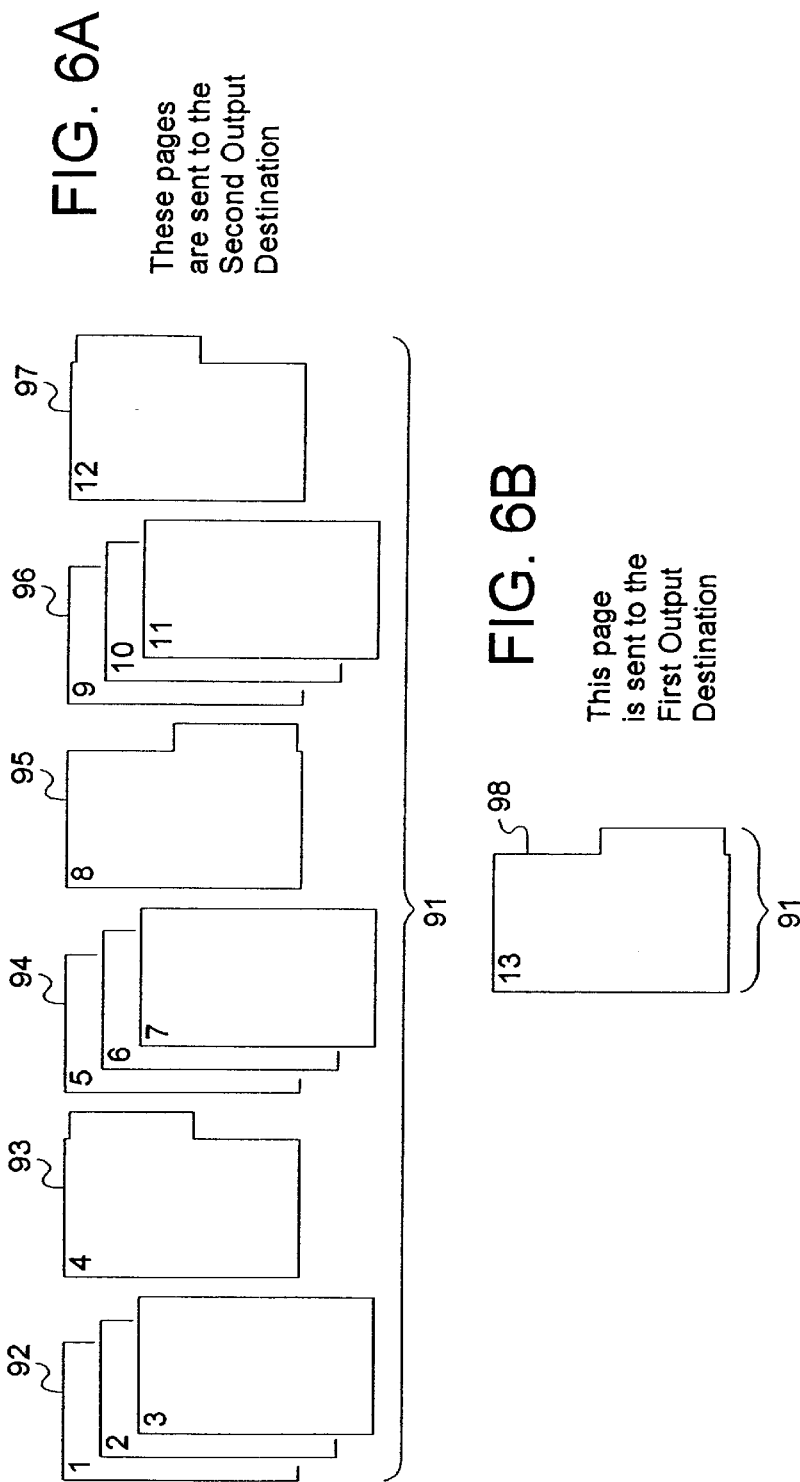

Table 2: Example of a Balanced MediaExit Pattern

| Page Identifier | Printed On? | Output Destination |
|---|---|---|
| 4 | True | Second Output Dest. |
| 8 | False | First Output Dest. |
| 8 | True | Second Output Dest. |
| 12 | False | First Output Dest. |
| 12 | True | Second Output Dest. |

FIG. 7C

Table 3: Example of an Unbalanced MediaExit Pattern

| Page Identifier | Printed On? | Output Destination |
|---|---|---|
| 4 | True | <JobExit> |
| 8 | True | <JobExit> |
| 12 | True | <JobExit> |
| last | False | Output Destination 1 |
| last | False | Output Destination 1 |

FIG. 7D

JAM RECOVERY WHEN USING ORDERED MEDIA

FIELD OF THE INVENTION

This invention relates to a method and apparatus for handling a jam recovery when using ordered media in a printing system.

BACKGROUND

A digital printing system with multiple media (e.g., paper) supplies and output destinations may have limited capability in the selection of different output destinations for the blank or printed output pages. For example, a digital printing system may only allow a user to select one output destination per output set for a print job. An output set refers to a group of output pages (e.g., printed output pages), which may be repeated for a single print job. Many digital printing systems generally fail to allow the operator to choose an output destination for individual pages of the output set. The user of the printing system may resort to inefficient, labor-intensive, and slow manual sorting processes to handle the proper grouping or collating of papers for a print job, where individual treatment of one or more output pages in the output set is required. Thus, a need exists for a printing system that supports selection of different output destinations, even for the same execution of a single output set of a print job to reduce printing costs and cycle time.

Some printing systems support special features which allow two output destinations to be used during a single print job. These printing systems typically use one exit (e.g., a top exit) for printing media of their system as a "purge" tray. For print jobs executed on such a printing system, the printing system determines if some of the media loaded in one of the input paper trays is not needed by a current or a successive print job, but must be fed through the system so that the next output set does not improperly use the wrong media. Accordingly, the printing system calculates how many unwanted sheets in the input paper tray must be "purged". However, the printing system may lack the flexibility to let a requestor choose when to route a page to the "purge" tray to customize a print job. Finally, many printing systems do not support printing on the pages which are sent to the "purge" tray, further detracting from the ability to tailor a printing job to meet the preferences of a user. Thus, a need exists to enhance a user's control over the routing of pages within a printer to support a customization of a print job.

Another feature that needs improvement in printing systems is jam recovery systems and methods. A printing system may experience a paper jam in the system somewhere between the input for feeding paper and the exit for the printed document. If ordered media, such as tabs, are used in a print job, jam recovery is particularly problematic. Therefore, a need exists for improved arrangements for jam recovery, particularly when using ordered media.

Additionally, when using ordered media within a print job, there may be instances where it is necessary to separate or dispose of unused portions or sheets of the ordered media. Therefore, there is also a need to provide improved systems and methods of disposing of such unwanted media.

SUMMARY OF THE INVENTION

In accordance with the invention, a printing system comprises at least one input source for storing a medium prior to printing or otherwise operating on the medium and a second input source to store at least one set of an ordered media comprising a plurality of sheets having different physical characteristics. A central processing unit stores a graphical representation of the set of ordered media. Upon the occurrence of a jam in the printing system, the central processing unit determines which sheet of the set of ordered media is the correct one to recover to. The central processing unit generates a graphical representation indicating the correct sheet of the set of ordered media to be recovered to and displays the representation on a display for the operator.

Preferably, the system also includes a scanner. The user scans in an image of the set of ordered media. In this manner, the scanned image of the correct sheet of the ordered media to recover to is displayed and, preferably, highlighted on the display.

BRIEF DESCRIPTION OF THE DRAWINGS

FIG. 4 is an example of different input media with a repeating collated sequence in accordance with the invention.

FIG. 6A and FIG. 6B are an example of an output set of the printing system in accordance with the invention.

FIG. 6C is a chart of a media exit pattern for establishing the output set of FIG. 6A and FIG. 6B.

FIG. 7C is a chart of a media exit pattern for establishing the output set of FIG. 7A and FIG. 7B.

FIG. 7D is a chart of an example of an unbalanced media exit pattern for the printing system in accordance with the invention.

DETAILED DESCRIPTION OF THE INVENTION

As used herein, a printing system shall refer to a digital printing system, a duplicating system, or both. This invention relates to a printing system that has at least one input source and preferably multiple input sources and at least one output destination. Further, where multiple input sources are present, each of the input sources may be loaded with different media (e.g., different types or sizes of paper). The printing system 26 may be capable of producing collated output sets of sheets, which are deposited in one or more of the output destinations.

Figure 1:
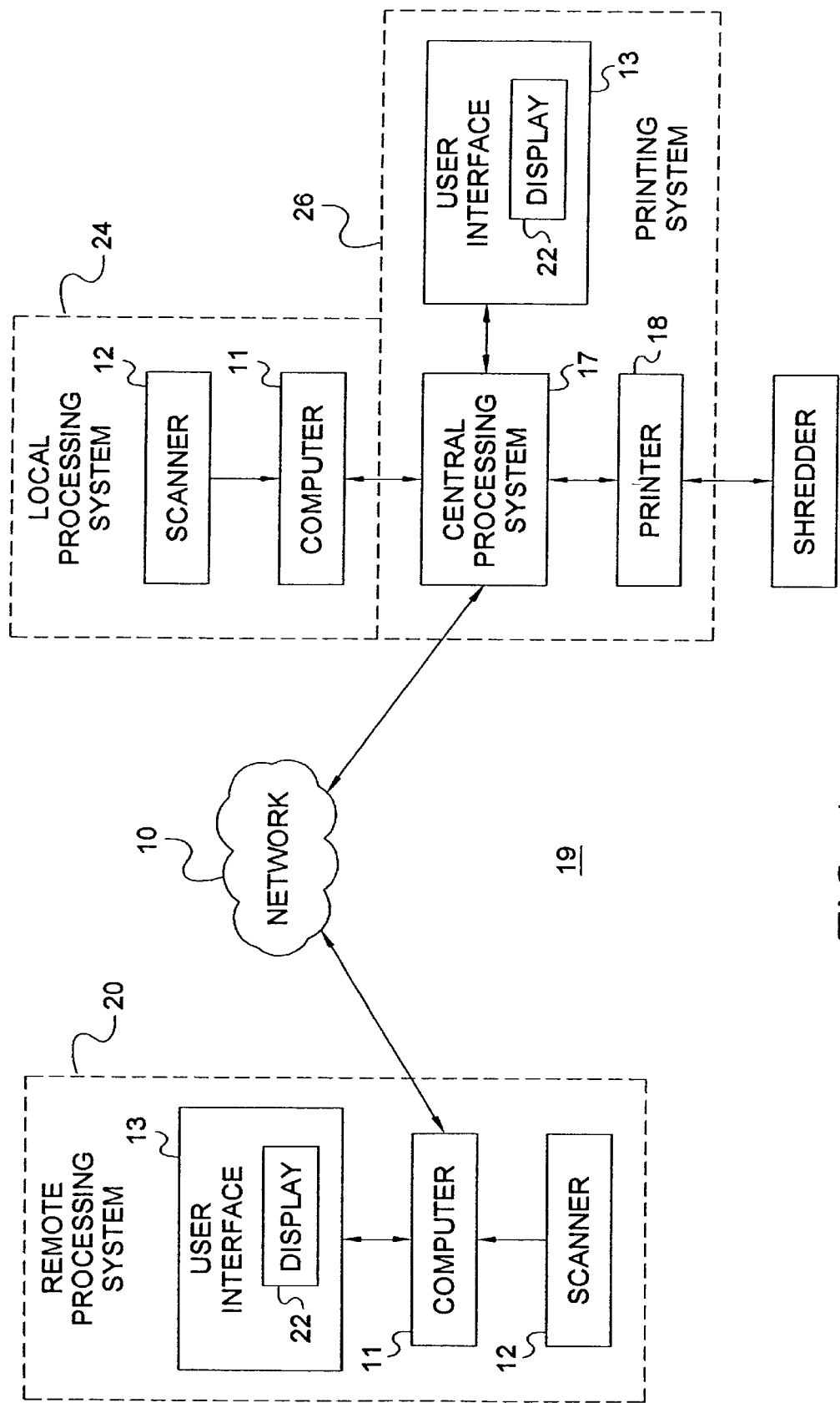
FIG. 1 is a block diagram of document production system in accordance with the invention.

In accordance with the invention, FIG. 1 shows a block diagram of a document production system 19. The document production system 19 includes a remote processing system 20, a communications network 16, a local processing system 24, and a printing system 26. The remote processing system 20 may communicate with the printing system 26 over the communications network 16. The local processing system 24 may communicate directly with the printing system 26.

The document production system 19 facilitates the conversion of a physical representation (e.g., printed page) of an input image to an electronic representation at the local processing system 24 or at the remote processing system 20. The document production system 19 facilitates the transfer of an electronic representation of one or more input images from a remote processing system 20 to the printing system 26 over the communications network 16. The printing system 26 processes the electronic representation in a manner that supports page-by-page routing of output pages to one or more output destinations of the printer 18.

The remote processing system 20 includes a user interface 13 coupled to a computer 11. In turn, the computer 11 is coupled to a scanner 12. In one embodiment, the user interface 13 refers to a graphical user interface that includes a keyboard, a pointing device (e.g., mouse), a display 22, and attendant software instructions to support the keyboard, the pointing device, and the display 22. The computer 11 may represent a source or receptor of one or more print jobs for the printing system 26. For example, the computer 11 may support a print job derived from the operation of the scanner 12. The computer 11 may transmit the print jobs, including electronic representations of input images or documents, to the printing system 26 via the communications network 16. The communications network 16 may refer to the Internet, an intranet, a circuit-switched network, a data packet network, an ethernet system, or any other suitable communications network.

The local processing system 24 includes a scanner 12 coupled to a computer 11. In turn, the computer 11 manages communications with a central processing unit 17 of the printing system 26. The local processing system 24 may represent a source or receptor of one or more print jobs to the printing system 26.

The remote processing system 20 or the local processing system 24 can create electronic representations of input pages for execution by the printing system 26. The scanner 12 supports scanning of input images on pages and producing an electronic representation of the input images for printing on the printing system 26.

The printing system 26 includes a central processing unit 17 that is coupled to a user interface 13 and a printer 18. The user interface 13 includes a display 22. The central processing unit 17 refers to a computer or data processing system, which accepts print jobs via the communications network 16 or otherwise. For example, the print jobs may come from the remote processing system 20, the local processing system 24, or both.

The central processing unit 17 controls many or all aspects of printing one or more print jobs on the printer 18. The central processing unit 17 may be physically implemented using one or more data processors, in a conventional or parallel computing architecture to control the printing process. The central processing unit 17 may determine a pattern of media feeds for each output set of a print job to achieve a desired appearance characteristic of sheets of an output set. The desired appearance characteristic may include scaling of an image, resolution of an image, contrast of an image, darkness or intensity of an image, the order of sheets in an output set, the selection of media for different sheets in an output set, stapling of sheets in an output set, binding of an output set, holes in media of the output set, or other attributes that affect the visual appearance or presentation of a print job.

The user interface 13 supports a user's selection of features of the printing system 26 or preferences in the ultimate presentation of the output set or print job produced by the printing system 26. Upon receiving a print job at the central processing unit 17, a user of the printing system 26 uses the user interface 13 to check the status of the print job or jobs. Further, the user may use the user interface 13 to determine how the print jobs are set up. The display 22 of the user interface 13 may have separate screens dedicated to corresponding functions such as displaying the status of the print job and structuring the setup of the print jobs. A screen represents an image that is displayed on the display 22 of the user interface 13.

Figure 2:
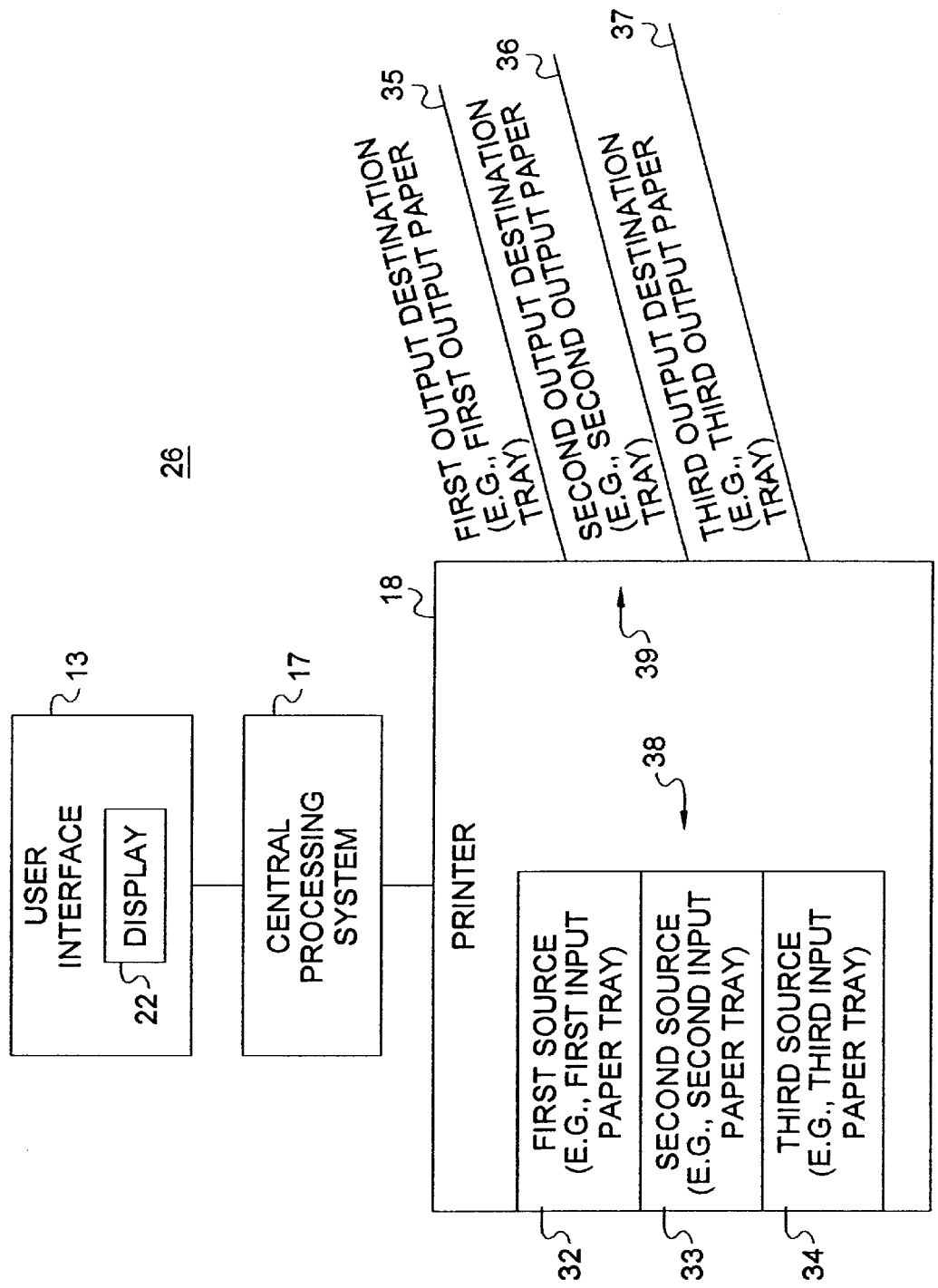
FIG. 2 is a diagram of a printing system with multiple input sources and output destinations in accordance with the invention.

An additional screen allows the operator to view the attributes of the media loaded in the input sources, which are shown in FIG. 2. Another additional screen provides the display of jam recovery instructions so that the user is notified of jam recovery instructions or instantaneous feedback on corrective measures that the user has applied to the printer 18.

FIG. 2 is a block diagram of a printing system 26 which has multiple input sources 38 and multiple output destinations 39. Like reference numbers in FIG. 1 and FIG. 2 indicate like elements. Although three input sources 38 and three output destinations 39 are shown, in other embodiments that fall within the scope of the invention, the printing system 26 may have as few as one input source and one output source. As shown in FIG. 2, the input sources 38 include a first input source 32, a second input source 33, and a third input source 34. The output destinations 39 include a first output destination 35, a second output destination 36, and a third output destination 37.

The output destinations 39 may represent several different alternative structures. In accordance with a first alternative, the output destinations 39 may be trays for holding an assortment of different types of media (e.g., paper). In accordance with a second alternative, the output destinations 39 may represent different finishing devices for application to one or more pages after the printing or passage of the pages through the printer 18 without printing on them. Finishing devices may include a stapler, a stacker, a folder, a binder, or another processing station for processing media sent to the output destination. For example, the first output destination 35 may be associated with a stapler that staples groups of paper, the second output destination 36 may be associated with a stacker that stacks paper in sequential order, and the third output destination 37 may be associated with a folder that folds paper to facilitate selective processing of the output pages of an output set of a print job.

Figure 3:
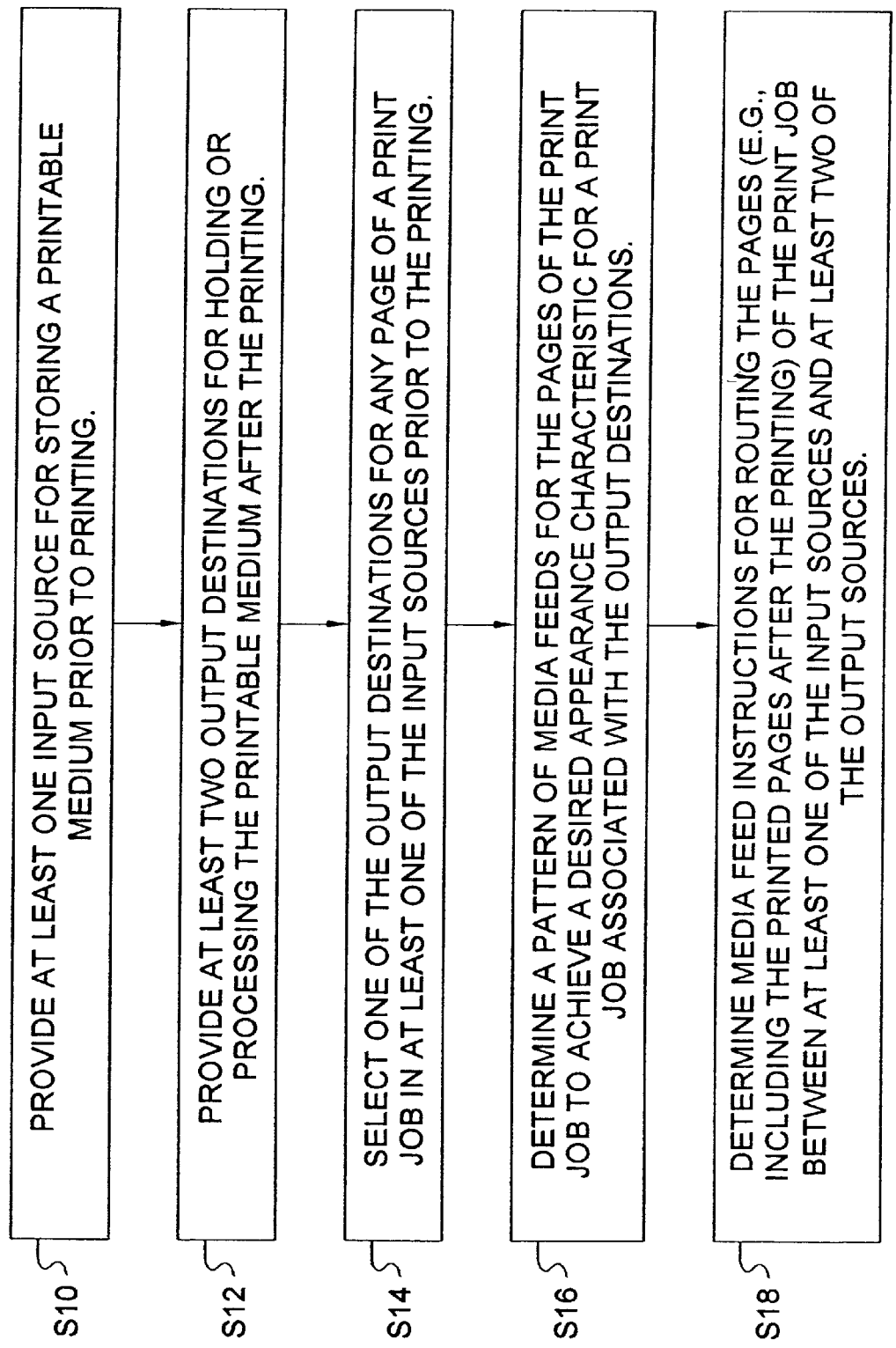
FIG. 3 is a flow chart of a method for directing input pages to one or more selected output destinations of the printing system in accordance with the invention.

FIG. 3 is a flow diagram of a method for directing input pages to one or more selected output destinations of a printer 18 in accordance with the invention. The method of FIG. 3 starts in step S10.

In step S10, the printing system 26 provides at least one input source 38 (e.g., first input source 32) for storing a medium prior to printing or otherwise operating on the medium. The printable medium may represent paper, a polymeric film, a transparency, a photographic quality paper, a cloth sheet, or any other medium suitable for printing.

In step S12, which may occur before, after, or simultaneously with step S10, the printing system 26 provides at least two output destinations 39 for holding or processing the medium after the printing or passage through the printer 18 without printing. In one example, the output destinations 39 comprise paper trays for holding or processing the medium. In another example, the output destinations comprise processing or finishing stations for stapling, binding, folding, or sorting one or more output pages of a print job.

In step S14, the user interface 13 supports the selection of one of the output destinations 39 for any page of a print job in at least one of the input sources 38 prior to the printing. The central processing unit 17 stores a print job identifier and page identifiers (e.g., page numbers) associated with the print job identifier. For each page identifier in the print job, the central processing unit 17 may assign a particular input source 38 to select a desired input medium and an output destination 39. The selection of the output destination 39 may support customized processing of an individual page, such as post-printing processing.

In step S16, the central processing unit 17 determines a pattern of media feeds for the page identifiers or pages of the print job to achieve a desired appearance characteristic or assembled characteristic for a print job associated with the output destinations 39. The central processing unit 17 may organize a print job into a table or database that defines the pattern of media feeds by using one or more of the following fields: job identifier, page identifier, input source, and output destination. Further, the central processing unit 17 may have a printing indicator field in the table or database. The printing indicator expresses whether a printer 18 is supposed to print on a particular page (with a designated page identifier) or leave the particular page blank prior to or while directing the page to the output destination.

In step S18, the central processing unit 17 determines media feed instructions for routing the pages (e.g., including the printed pages after the printing) of the print job between at least one of the input sources and at least one of the output sources. The central processing unit 17 converts the information in the table or database into printer-readable language or instructions for controlling the printing operation and the direction of pages from the at least one input source 38 to one or more output destination sources 39.

FIG. 4 shows several examples of groups (51, 61, and 71) of sequentially ordered pages for placement in the input source 38 of the printing system 26. A first group 51 of sequentially ordered pages includes tabs 57 that vary in position on each sequential page. Although the first group 51 includes a first page 52, a second page 53, a third page 54, a fourth page 55, and a fifth page 56, an alternate embodiment may use more or less pages for the first group 51. A second group 61 of sequentially ordered pages includes differently colored pages. Although the second group 61 includes a red page 62, a blue page 63, and a green page 64, other colors of pages for the second group 61 fall within the scope of the invention. A third group 71 of sequential ordered pages includes pages with at least two different tab positions 74. The tabs of the third group 71 may have printing on them even when they are first placed in the input source 38. Although the third group 71 includes a first page 72 and a second page 73, the number of pages may be generally commensurate with the number of tab positions in an alternate embodiment. Any of the foregoing input sources 38 may hold letter paper or some other medium instead of the aforementioned media.

A user of the printer 18 may load the first group 51, the second group 61, or the third group 71 into corresponding ones of the input sources 38. For example, the user may load repetitive sets of the first group 51 into the first input source 32, repetitive sets of the second group 61 into the second input source 33, and repetitive sets of the third group 71 into the third input source 34. The user enters a selection of the input sources 38 or a selection of a particular medium or arrangement of media associated with an input source 38 prior to printing on or otherwise processing the pages in the input sources 38 for a print job.

In general, FIG. 5A through FIG. 5D illustrate various screens that may be displayed on the user interface 13 of the remote processing system 20, the printing system 26, or both. A screen is an image on the display 22 that supports user interaction with the printing system 26. A screen may be displayed on the display 22 to enable a user to control various aspects of the printing system 26.

Figure 5A:
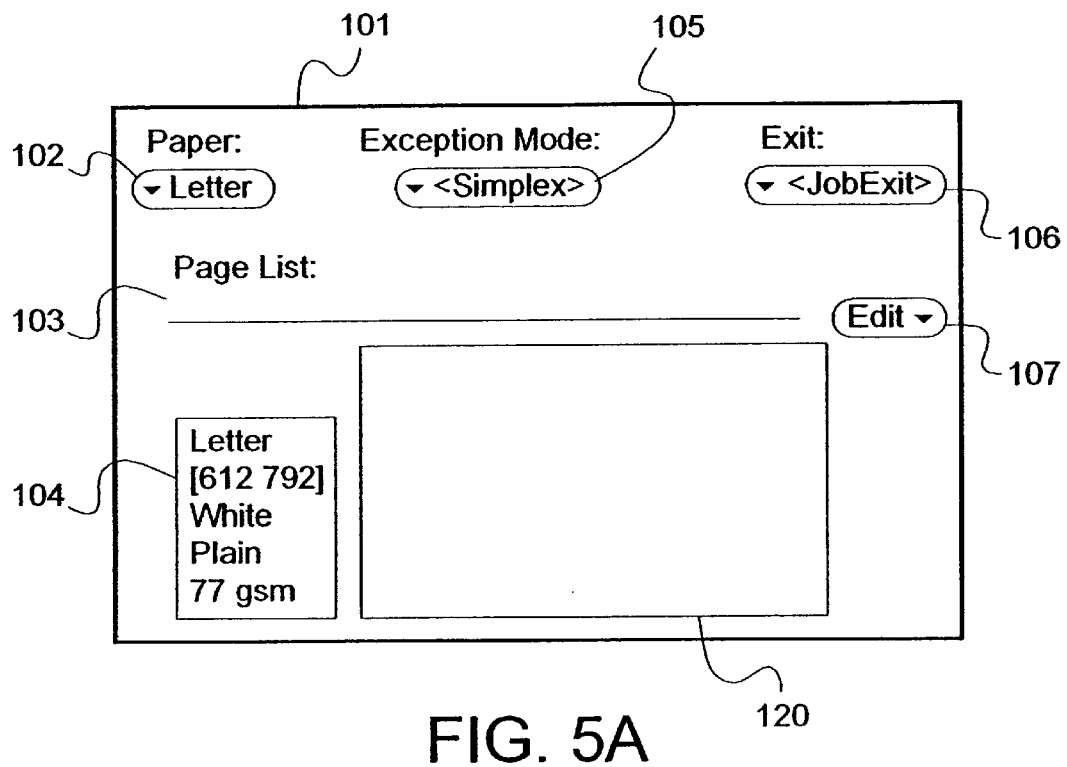
FIG. 5A is an illustrative screen associated with a user interface for making a print job request in accordance with the invention.

The screen 101 of FIG. 5A includes a medium indicator 102 (e.g., "Paper"), an exception mode 105, an output destination indicator 106 (e.g., "Exit"), and an editing indicator 107 (e.g., "Edit"). The operational parameters of the medium indicator 102, the exception mode 105, the output destination indicator 106, and the editing indicator 107 may be selected from pull-down menus. A user may reveal a pull-down menu by operation of the pointing device of the user interface 13 or otherwise.

In one example, the user may select a media for the pages to be printed by using the pull-down menu associated with the medium indicator 102. For the media selection indicated by media indicator 102 (e.g., "Paper"), the respective attributes are shown in a text box 104. The user can select a duplex (i.e., two-sided) or simplex (i.e., one-sided) copy using the pull-down menu 105 associated with the exception mode 105.

The user can select an output destination 39 using the pull-down menu associated with the output destination indicator 106. The selected output destination may be referred to generally as a "<JobExit>". If a user designates a particular output destination as a "<JobExit>" for a print job, the particular output destination is regarded as the primary output destination for the print job. The selected output destination determines how a page is directed from an input source 38 to the output destination 39 of the printer 18. The options for pull-down menu of the output destination indicator 106 are: "<JobExit>", "out1", "out2", "out3+", "out1+", "out2+", "out3+", where "out1" is an abbreviation for first output destination 35, "out2" is an abbreviation for the second output destination 36, and "out3" is an abbreviation for the third output destination 37.

The jam recovery assistance indicator is represented by the "+" sign, which is appended at a suffix to the foregoing abbreviations of the output destinations. The jam recovery assistance indicator denotes that the user wants jam recovery assistance for the identified pages and media.

The user types a list of page identifiers (e.g., page numbers) and the keyword "last"on the page identifier list 103 (e.g., "Page List") to apply the previously entered media selection 102, exception mode 105, and output destination 106 to the identified pages set forth on the page identifier list 103. After typing the page numbers into the page identifier list, the user may select an editing option to apply to the print job from an editing menu 107.

Figure 5B:
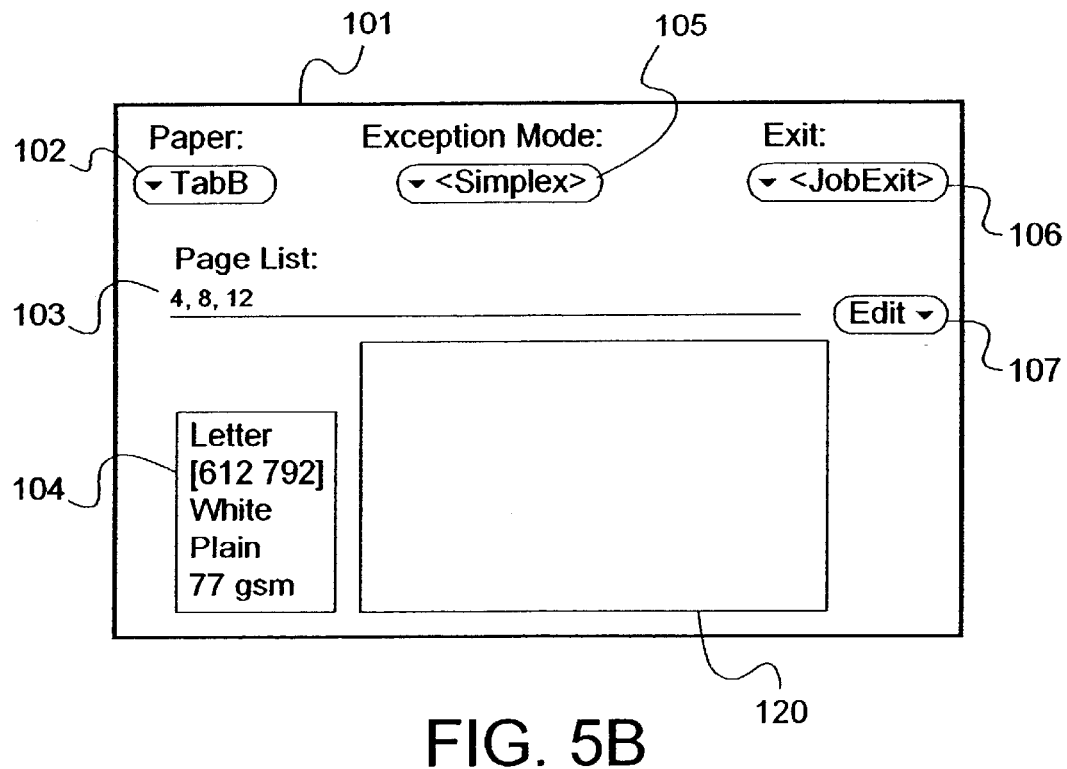
FIG. 5B is an illustrative screen demonstrating an early stage of a print job request in accordance with the invention.

FIG. 5B shows a screen as it would look after a user typed a list of page numbers via the user interface 13 on the page identifier list 103. This user also selected a new media called "TabB" by making a selection through a pull-down menu associated with the medium indicator 102. The selected medium is described in the text box 104. Finally, the user selects the option "Insert" from a menu associated with the editing indicator 107.

Figure 5C:
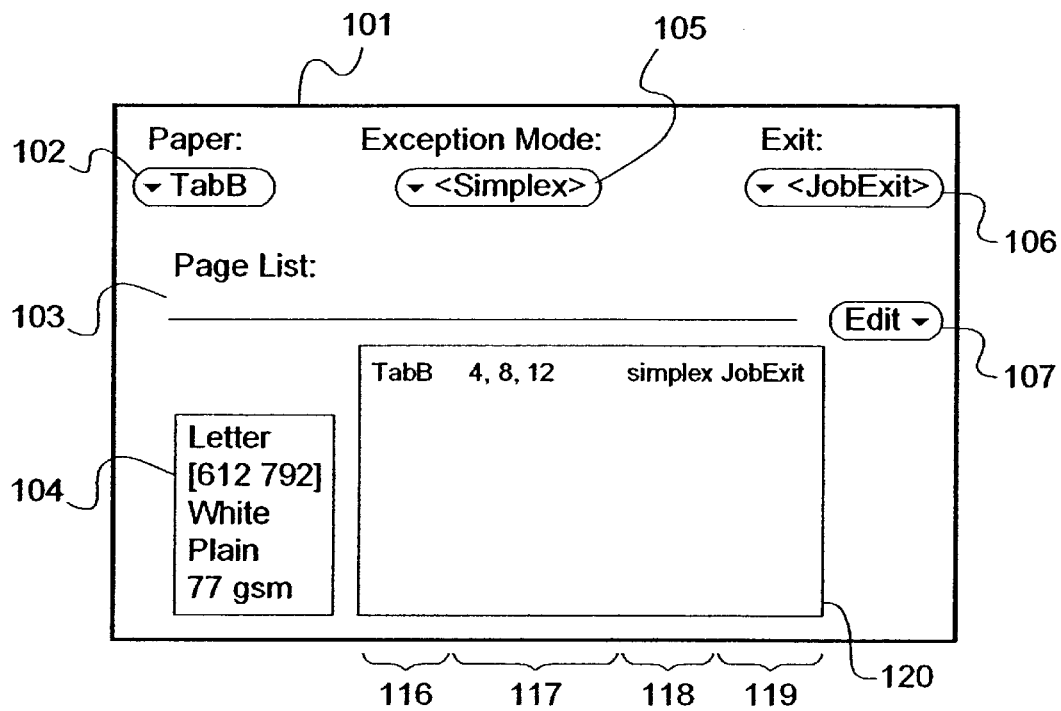
FIG. 5C is an illustrative screen showing a print job request in progress following the screen of FIG. 5B.

FIG. 5C shows the appearance of the screen after the procedure of FIG. 5B is executed. The text window 120 of FIG. 5C has four main columns (116, 117, 118, and 119). The leftmost column 116 represents the media indicator 102. The first intermediate column 117 represents a page identifier list 103. The second intermediate column 118 represents the exception mode 105. The rightmost column 119 represents the output destination indicator 106. The instructions in the text window 120 are in an acceptable format for interpretation by the central processing unit 17.

Figure 5D:
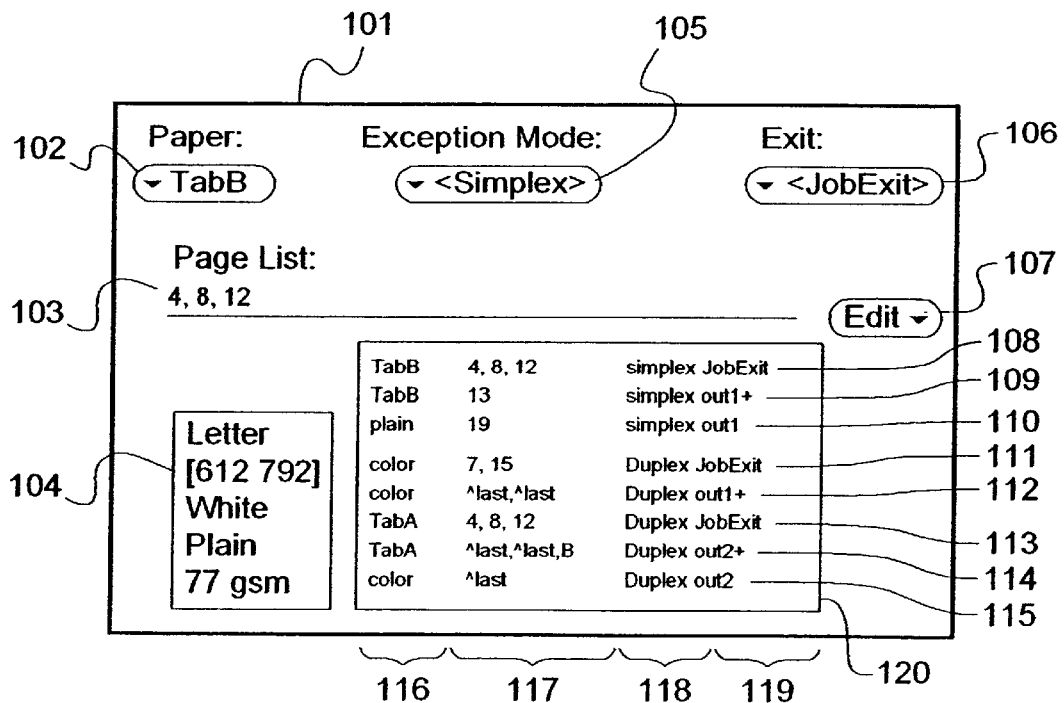
FIG. 5D is an illustrative screen showing a print job request in progress following the screen of FIG. 5C.

By repeating the entry of data into the user interface 13, the user may eventually populate the text window 120 as shown in FIG. 5D. The screen of FIG. 5D has a plurality of rows, which are labeled from 108 to 115, inclusive. The user types lines 113 and 114 in the text window 120 on the user interface 13 as shown in FIG. 5D. In the leftmost column, the media name is "TabA" of the text window 120 in FIG. 5D. The user wants to print all pages. The user also enables jam recovery messaging using the "+" appended to the desired output destination (e.g., "out2+") as shown in column 119.

In accordance with another feature of the invention, the printing system will provide the user with graphical representations on the display 22 to assist the user in jam recovery. The jam recovery feature may be particularly important in printing systems where ordered media comprised of sheets having different physical characteristics, such as tabs, are used. In such an arrangement, the user sets up the print job by inserting the paper for the main body of the document to be printed in the first input source 32. Sets of the ordered media (at least one) are provided in the second input source 33. Each sheet of the ordered media comprises a plurality of different sheets to be inserted at specified locations in the body of the final document to be printed. If a jam occurs in the system, the operator needs to know where to recover to in the set of ordered media being processed at the time of the jam. That is, the operator needs to know if any of the sheets in the ordered media set need to be removed from the set.

In one embodiment of the present invention, the CPU 17 is programmed to determine the appropriate place to recover to in the supply of ordered media after a jam occurs in the printing system 26. That is, the CPU 17 determines which sheets, if any, in the set being used before the jam need to be removed. The CPU 17 generates a graphical representation assigned to the sheets and sends the graphical representation to display 22 of the user interface 13. The graphical representation indicates the appropriate starting point of the ordered media after a jam. The graphical representation may be, for example, a graphic with the completed pages highlighted to show the operator the recovery point. Alternatively, the system can display a graphic showing the particular sheet to recover to. The user then strips the sheets of ordered media that need to be discarded from the input source containing the ordered media.

Preferably, for ordered media consisting of tabs, the system displays a graphical representation on the display 22 of the correct tab to recover to.

In another feature of the invention, the scanner 12 may be used to scan an image of the set of ordered media. This may be particularly useful on ordered media that comprises photographs that may be hard to distinguish from one another. The scanned image would be saved to memory and when a jam occurred, the CPU 17 would determine the appropriate starting point for the ordered media. The image of the correct ordered media provided by the CPU 17 appear on the display 22. Preferably, this is implemented by generating a thumbnail of the ordered media on the screen and accenting or highlighting the correct thumbnail to inform the operator which image to recover to. Preferably, the CPU 17 is programmed to display an enlarged image of the correct sheet for better viewing by the operator.

In one embodiment, the system can be programmed to store an image of the scanned in set of ordered media or the tabs necessary for a particular job. The stored data can then be used as part of preset job tickets. This feature may be particularly useful for jobs that are run on a periodic basis. For example, if a job is run once a month, the operator may store the scanned images once and store the images as a job ticket and then in the following months the operator would invoke the job ticket. A more detailed disclosure of job tickets is provided in commonly assigned U.S. patent application Ser. No. 09/572,341, entitled "System And Method For Implementing Compound Documents In A Production Printing Workflow," which is incorporated herein by reference.

In accordance with FIG. 5D, the user could type line 110. Unlike the previous examples, the user does not enable jam recovery messages in line 110. Line 110 allows page nineteen from the job to be sent to the first output destination 35. The user may want part of the print job, such as page nineteen, handled differently by the printing system 26. For example, page nineteen might be a printed instruction sheet for the operator describing what to do with the rest of the printed output. It could also be a status page.

The user could type lines 111, 112 and 115. The instructions of line 111 in the text window 120 would instruct the printing system 26 to print on "color" media for pages seven and fifteen. The instructions of line 112 instruct the printing system 26 to send two unprinted sheets of "color" media would be sent to the first output destination 35 at the end of each set. The instructions of line 115 instruct the printing system to send one unprinted sheet of "color" media to the second output destination 36.

FIG. 6A and FIG. 6B together show an example of an output set 91 which could be generated by the printing system 26. This output set 91 would be generated from thirteen input pages in one or more input sources 38. Here, the print job has already specified the "<JobExit>" to be the second output destination 36 via the user interface 13. The first input source 32 contains paper or another media with two tabs. The second input source 33 contains "letter" media, such as letter size paper. To produce the output set of FIG. 6A and FIG. 6B, the user types lines 108 and 109 of FIG. 5D of the text window 120 into the user interface 13. The media name for the paper with two tabs is "TabB" as shown in column 116 of the text window 120 in FIG. 5D. The user wants to print all pages of the output set with "TabB" for pages 4, 8, and 12. The user also enables jam recovery messaging for page 13 using the "+" appended to the desired output destination as shown in column 119.

FIG. 6A and FIG. 6B shows one output set 91 of a print job consistent with the entry of the input instructions into the text window 120 of the user interface 13. The pages in the group of FIG. 6A are sent to the second output destination 36. The pages of the group of FIG. 6A are actually stacked on top of each other in the second output destination 36. FIG. 6A shows the letter sheets and the "TabB" media sheets next to each other for purposes of clearly identifying the "TabB" media sheets.

First, the central processing unit 17 directs pages one, two, and, three, collectively designated group 92, from the second input source 33 to the second output destination 36. The group 92 of pages one, two, and three represent "letter" media or printed-on letter media. Second, the central processing unit 17 directs input page four, designated 93, from the first input source 32 to the second output destination 36. Page four 93 represents the first type of "TabB" media or printed-on "TabB" media. Third, the central processing unit 17 directs pages five, six and seven, collectively designated 94, from the second input source 33 to the second output destination 36. The fifth, sixth, and seventh pages represent "letter" media or printed-on letter media. Fourth, the central processing unit 17 directs input page eight, designated 95, from the first input source 32 to the second output destination 36. The eighth page is printed on the second type of "TabB" media. Fifth, pages nine, ten and eleven, designated collectively as 96, are printed on "letter" media from the second input source 33 and directed to the second output destination 36. Sixth, input page twelve 97 is printed on the second "TabB" media and directed from the first input source 32 and directed to the second output destination 36. Finally, the thirteenth page is removed from the first input source 32 and sent to the one of output destinations 35 or 36.

FIG. 6C provides a table of a media exit pattern for the output set of FIG. 6A and FIG. 6B. The table specifies the output set in terms of a page identifier, a printing indicator, and an output destination, which may be processed by the central processing unit 17.

Figure 7A:
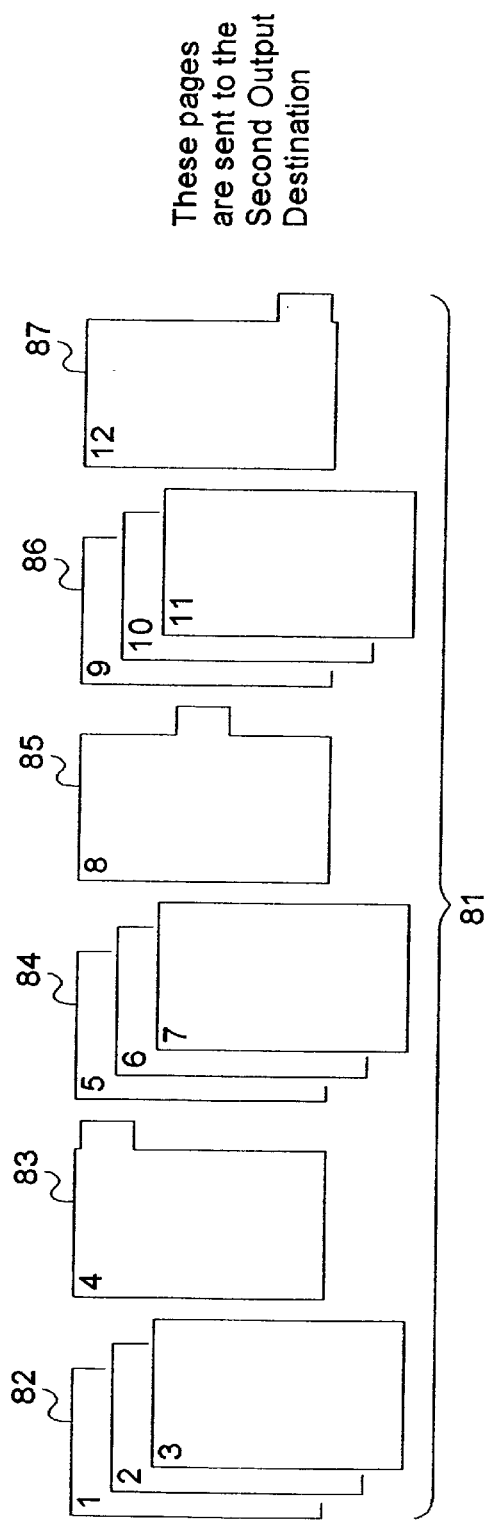
FIG. 7A and FIG. 7B are an example of output set of the printing system in accordance with the invention.
Figure 7B:
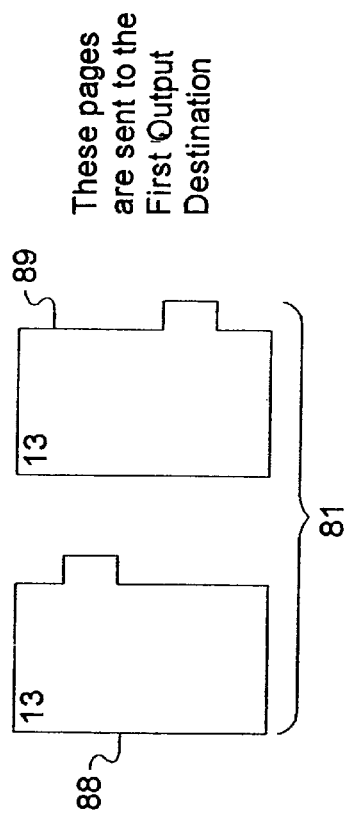

FIG. 7A and FIG. 7B illustrate a second example of an output set which could be generated by the printing system 26 of FIG. 1. The output set of FIG. 7A and FIG. 7B may be generated from fourteen input pages in the input sources 38. Here, for the print job in FIG. 7A and FIG. 7B, a user has already requested the "<JobExit>" to be the second output destination 36 via the user interface. The first input source 32 contains a five-part tab media. The second input source 33 contains "letter" media, such as letter-size paper.

FIG. 7A and FIG. 7B collectively show one output set 81 of a print job. The pages of FIG. 7A are sent to the "<JobExit>" which is designated the second output destination 36 for the print job via the user interface 13. Pages of FIG. 7A are actually stacked on top of each other in the second output destination 36. FIG. 7A show them next to each other for purposes of clearly identifying the "TabA" media sheets.

The first pages delivered are pages one, two and three 82, which are collectively designated as group 82. Group 82 are printed on "letter" media. Input page four, designated 83, is printed on the first "TabA" media. Pages five, six and seven, designated group 84, are printed on "letter" media. Before printing page 8, the system sends an unprinted "TabA" media 88 to the first output destination 35 as indicated in FIG. 7B. Input page eight, designated 85, is printed on the third "TabA" media 85. Pages nine, ten and eleven, collectively designated 86, are printed on "letter" media. Page twelve, designated 87, is printed on the fifth "TabA" media. Before printing page twelve 87, the system sends an unprinted "TabA" media 89 to the first output destination 35.

The printing system 26 may build a page feed command for the printer 18 using a special balanced media exit pattern consistent with the table of FIG. 7C. The user enables the special balanced media exit pattern by specifying the term "B" in the page list 103 as shown in line 114 of the text window 120 in column 117 of FIG. 5D. A balanced media exit pattern refers to a media exit pattern that distributes media for a print job in a generally equal or even-handed manner between or among different output destinations 39.

In FIG. 7D, a chart shows a media exit pattern using an unbalanced media exit pattern. For this example, the media repeats for pairs of successive sheets, but the job request in the chart repeats every four sheets. In other respects the media exit pattern of FIG. 7D is similar to the media pattern exit of FIG. 7C.

Figure 8:
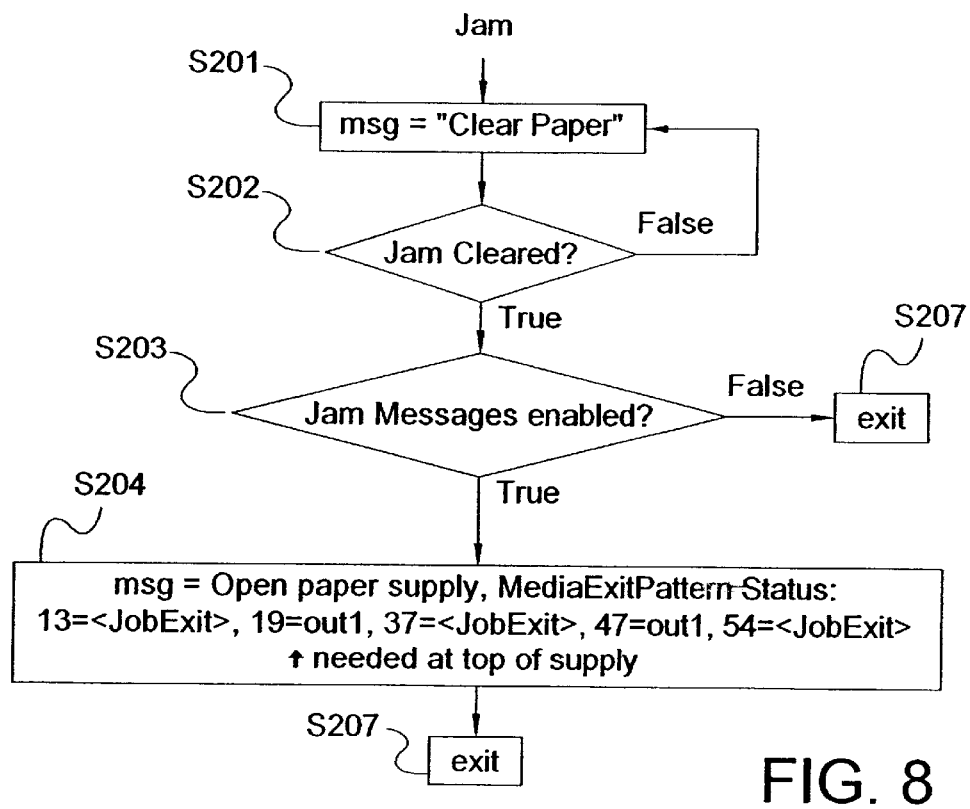
FIG. 8 is a flow chart for one embodiment of a method for generating a jam recovery message in accordance with the invention.

FIG. 8 shows a flow chart for a method of jam recovery assistance in accordance with the invention. The method of FIG. 8 begins in step S201.

In step S201, if a paper jam is present in the printer 18, the user interface 13 may display messages on the display 22 that instruct the operator to "clear paper" or to remove all paper in the paper path of the printer 18.

In step S202, the printer determines if the jam was cleared by removing the paper. If the jam was cleared, the method continues with step S203. Otherwise, if the jam is not cleared, the method loops back to step S201.

In step S203, the printing system 26 checks if jam recovery is enabled for any page (e.g., page identifier) of a print job. The user may have previously enabled jam recovery by making an entry (e.g., appending a "+" to the output destination) in the user interface 13 on a page-by-page basis for a print job. If jam assistance is enabled for at least one page of the print job the method continues with step S204. Otherwise, if jam assistance is not enabled for any page of the print job, the method ends in step S207.

In step S204, if assistance was enabled, then the system displays a message showing where the printing system 26 is in its media exit pattern 204. The status may be indicated by the page identifier associated with corresponding output destinations. The user interface 13 would inform the user to open the paper supply to verify the top sheet of input media was correct for the current output set. Then, the machine would continue to print the output set. The method of FIG. 8 ends in step S207 following the display of the message in step S204.

Figure 9:
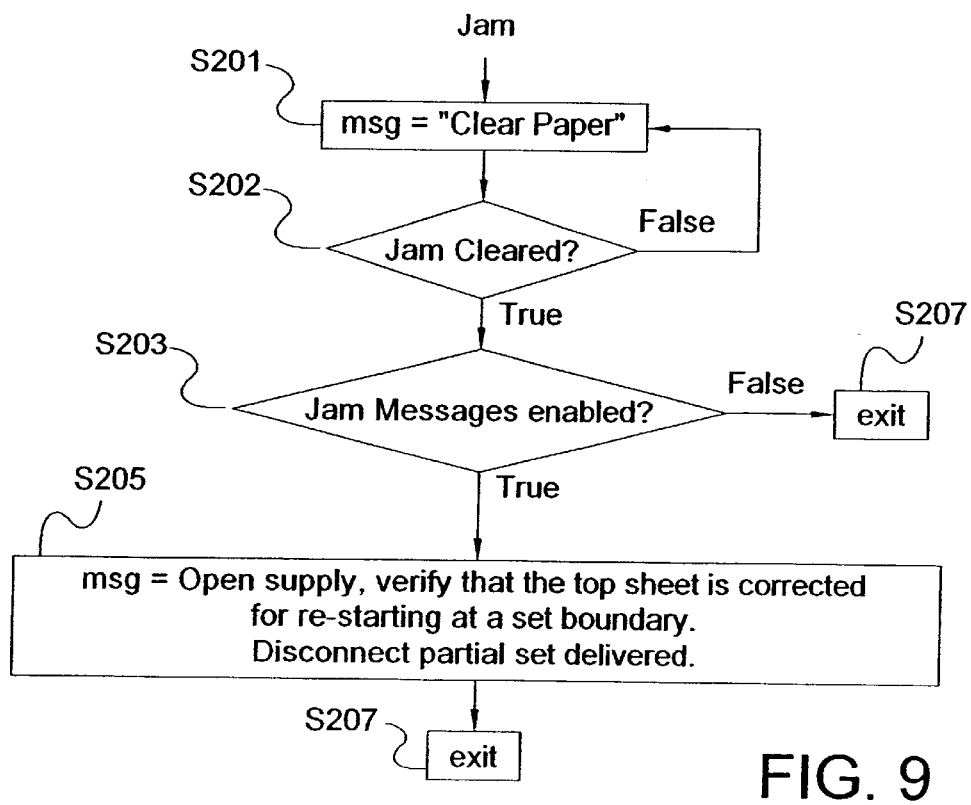
FIG. 9 is a flow chart for another embodiment for generating a jam recovery message in accordance with the invention.

FIG. 9 shows an alternative method for jam recovery in accordance with the invention. Like reference characters in FIG. 8 and FIG. 9 indicate like steps or procedures. The method of FIG. 9 is the same as the method of FIG. 8 except the method of FIG. 9 replaces step S204 with step S205. In step S205, which may follow step S203, if assistance was enabled, then the system displays a message telling the user to discard the partially printed set, and to verify that the paper supply is correct to start printing the next set. The method of FIG. 9 ends in step S207 following display of the message in step S205.

Figure 10A:
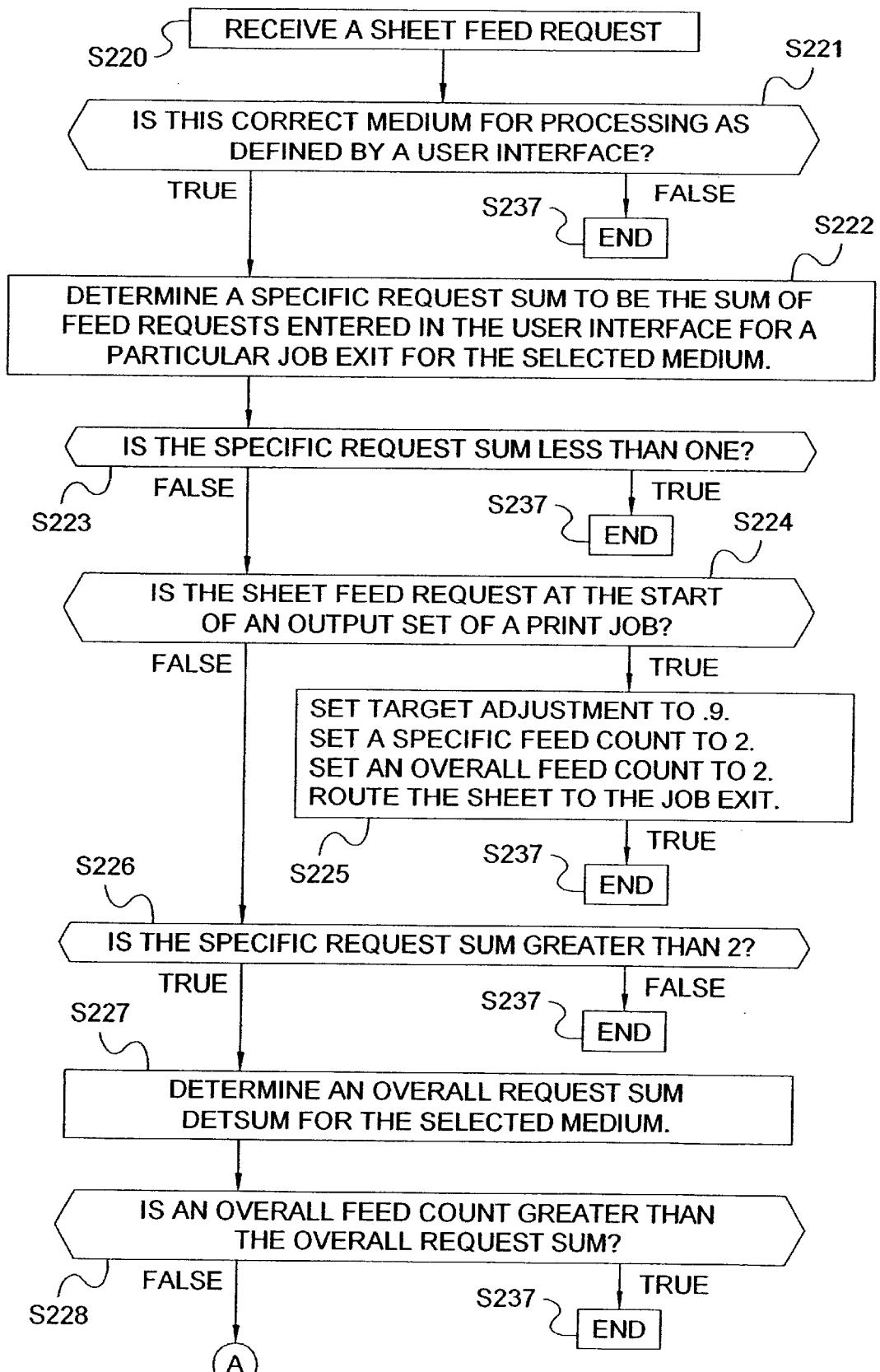
FIG. 10 is a flow chart for a method for determining a balanced media exit pattern in accordance with the invention.
Figure 10B:
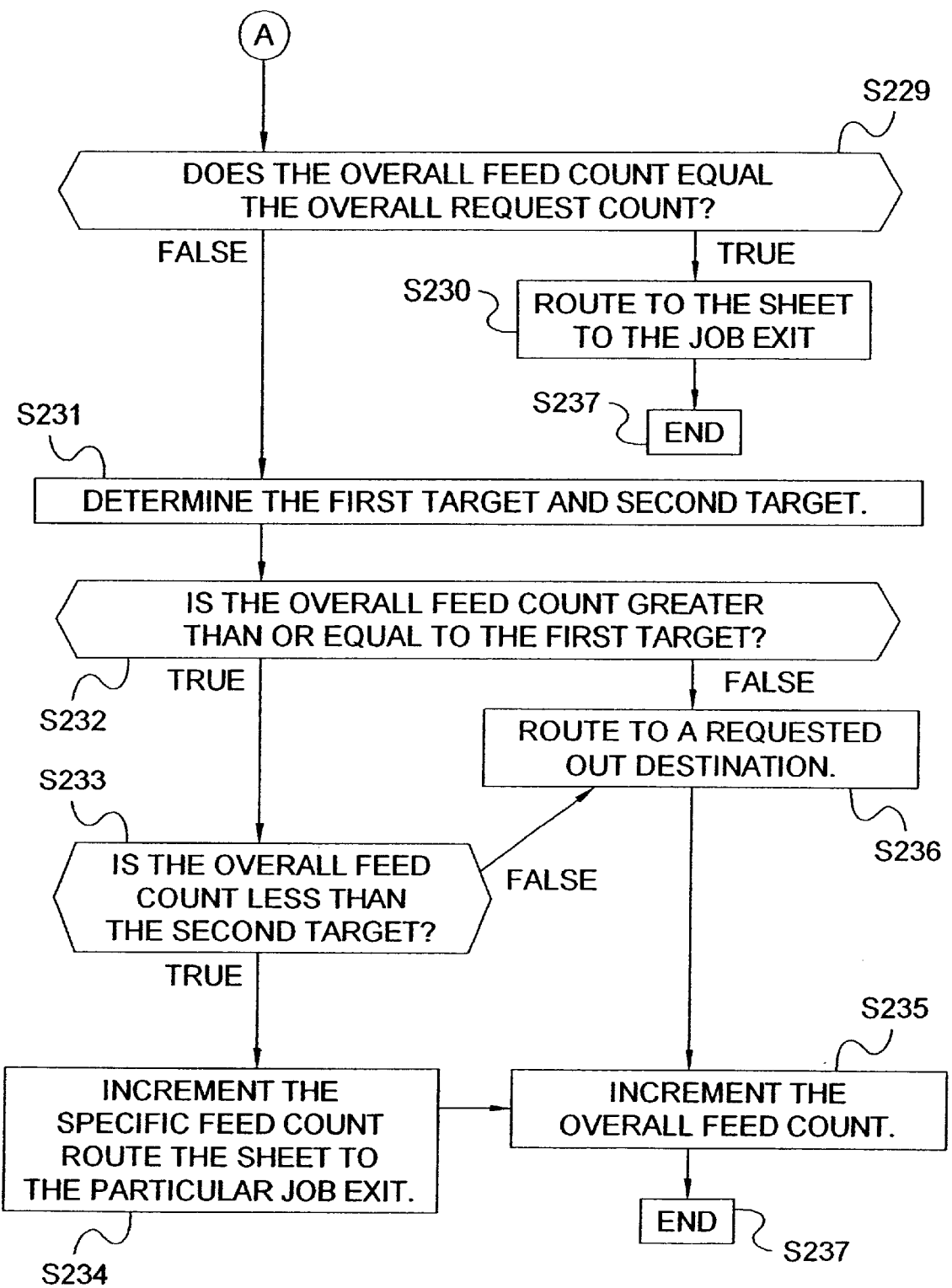

FIG. 10 shows a flow chart for the method of balanced media exit pattern determination. A user may invoke or enable the method of FIG. 10 by typing the "B" in column 117 of the text window 120 in FIG. 5D. Before balancing, the media exit pattern might resemble the example of FIG. 7D. After balancing the media exit pattern might resemble the example of FIG. 7C.

Referring to FIG. 10, for each sheet feed handled by the printer 18, one cycle of the method may be invoked. A cycle starts at step S220 with the reception of a sheet feed request via entry from a user interface 13. The cycle may end at any of the point's labeled step S237. FIG. 10 uses various counters (e.g., register values) during a cycle. The values of the counters may be retained for multiple passes through the method of FIG. 10 until a print job or a set within a print job is complete, where a set may include multiple page feed requests.

In step S221, the printing system 26 determines if the medium currently selected in one of the sources 38 is the correct medium to be processed. If the media currently selected to be fed is the correct medium, which may be referred to as the exit medium, then the method continues with step S222. However, if the media being fed is not the exit media then the method ends in step S237. The end in step S237 means the method is complete and no further action is needed for this sheet feed request. However, a print job or a set in a print job may require the execution of multiple sheet feed requests and multiple executions of the method of FIG. 10.

In step S222, the printing system 26 determines a specific request sum to equal the sum of feed requests entered in the user interface 13 for a particular job exit for the selected medium. For example, the printing system 26 examines the media exit pattern, keeping a count of the number of times the "<JobExit>" is found. Here, a counter may be designated as the specific request sum and the value of the counter is equal to the sum of the media feed requests for the "<JobExit>". For example, the value of the counter or the specific request sum would be three for the media exit pattern of FIG. 7D because the media exit pattern has three occurrences of "<JobExit>" for each output set.

In step S223 after step S222, the printing system 26 determines if the specific request sum is less than one. The printing system 26 invokes step S223 to check for an invalid media exit pattern. If the media exit pattern is valid, the value of specific request sum is not less than one. Therefore, if the printing system 26 determines that the value of the specific request sum is less than one, the method ends with step S237. Otherwise, if the printing system 26 determines that the value of the specific request sum is not less than one, the method continues with step S224.

In step S224, the printing system 26 determines if the present page being fed is at the start of an output set of a print job. For example, the printing system 26 may reference a page counter that counts each page of an output set for a print job by incrementing the page counter. The set counter is reset at the beginning of each output set. An output set may involve multiple sheet feed requests and cycles of FIG. 10. If the present page is at the start of an output set, the method continues with step S225. If the present page is not at the start of the an output set, the method continues with step S226.

In step S225, the printing system 26 initializes a number of printing parameters that are used later in the method of FIG. 10. Printing parameters may include a target adjustment value, a specific feed count, and an overall feed count. The target adjustment value may be set from zero to one. For example, the target adjustment value may be set to 0.9 to provide good results or other values consistent with experimental tests. In one embodiment, the specific feed count is set to two and the overall feed count is set to two to prepare for any subsequent processing in accordance with FIG. 10. Further, in step S225, the first sheet of the output set is routed to the job exit. Route to the job exit results in the printing system 26 sending the first media to exit to the "<JobExit>". After step S225, the method may end in step S237 following step S225.

In step S226, the printing system 26 determines if the value of the specific request sum is greater than or equal to two. That is, step S226 determines if there is only one "<JobExit>" request remaining to be executed in the media exit pattern. If the value of specific request sum is not greater than or equal to two, then the method ends in step S237. If the value of the specific request sum is greater than or equal to two, then the method continues with step S227.

In step 227, the printing system 26 determines an overall request sum for the selected medium for the sheet feed request. For example, the printing system 26 examines the media exit pattern, keeping a count of the total number of times any exit (i.e., output destination 39) is requested via the user interface 13. For example, the media exit pattern of FIG. 7C has a total of five occurrences that are split unequally between the first output destination 35 and the second output destination 36. Accordingly, the overall request sum would be five for the example of FIG. 7C. The overall request sum represents the sum of all media feed requests for a media for an output set of a print job.

In step S228, the printing system 26 determines if the value of overall feed count exceeds the value of the overall request sum. The overall feed count represents the total count of the media feeds that have been serviced so far by the printing system 26 for the output set. If the value of the overall feed count is greater than the overall request sum, the method ends in step S237. The test of step S228 is used to end the method in step S237 if all the required media feeds for the output set of the sheet feed request have been completed. However, if the value of the overall feed count is not greater the overall request sum, the method continues with step S229 because the sheet feed request contains remaining, required media feeds that have not yet been serviced.

In step S229, the printing system 26 determines if the value of overall feed count equals the value of overall request sum. If the value of overall feed count equals the value of overall request sum, the method continues with step S230. If the value of overall feed count does not equal the value of overall request sum, the method continues with step S231.

In step S230, the printing system 26 causes the last requested sheet for the media exit to be routed to the appropriate output destination (e.g., "<JobExit>"). Thus, the printing system 26 may be programmed to allocate the first and last entries in the media exit pattern as "<JobExit>" pages. The "<JobExit>" designation generally affords the assignment of any output destination in a consistent manner within a print job to promote flexibility.

In step S231, the printing system 26 determines values for the first target and the second target to be used in subsequent steps S232 and S233. The first target and the second target may be used to identify pages that are routed to a selected output destination (e.g., a particular job exit) of the printing system 26 for special post-printing processing, for example.

The printing system 26 may distinguish between different pages by tracking a specific feed count for a particular output destination and an overall feed count for all output destinations collectively.

The first target may be determined in accordance with the following equation:

$$T_1 = F_S * R_O / (R_S - T_A),$$

where $T_1$ is the first target which may represent a highest priority job exit feed target, $F_S$ is a specific feed count which represents a cumulative feed count for a particular job exit, $R_O$ is an overall request sum which represents the sum of feed requests for any or all job exits, $R_S$ is a specific request sum, and $T_A$ is a target adjustment which represents an adjustment of a job exit target (e.g., at least the first target).

The second target may be determined in accordance with the following equation:

$$T_2 = F_S * R_O / (R_S + (1 - T_A)),$$

where $T_2$ is the second target which represents a lowest priority job exit feed target, $F_S$ is a specific feed count which represents a cumulative feed count for a particular job exit, $R_O$ is an overall request sum which represents the sum of feed requests for any or all job exits, $R_S$ is a specific request sum, and $T_A$ is a target adjustment which represents an adjustment of a job exit target (e.g., the first target and the second target).

In step S232 after step S231, the printing system 26 determines if the overall feed count is greater than or equal to first target. If the overall feed count is greater than or equal to first target, the method continues with step S233. However, if the overall feed count is not greater than or equal to first target, the method continues with step S236.

In step S233, the printing system 26 determines if the overall feed count is less than the second target. If the overall feed count is less than the second target, the method continues with step S234. However, if the overall feed count is not less than second target, the method continues with step S236.

In step S236, the page is routed to a requested output destination 39 (e.g., first output destination). After step S236 in step S235, the overall feed count is incremented by one. After step S235, the method ends in step S237.

In step S234, the specific feed count is incremented (e.g., by one) and page is routed to the particular job exit (e.g., <JobExit>). One of the remaining "<JobExit>" entries may be used for the current media feed in step S234. If the remaining entry is not used for the current media feed, the sheet is routed to the alternate exit specified in the exit pattern media.

In step S235 after step S234, the printing system 26 increments the overall feed count of an exit pattern media feeds. Although the method of FIG. 10 may end in step S237, multiple cycles of FIG. 10 may need to be executed to complete an output set of a print job.

Figure 11:
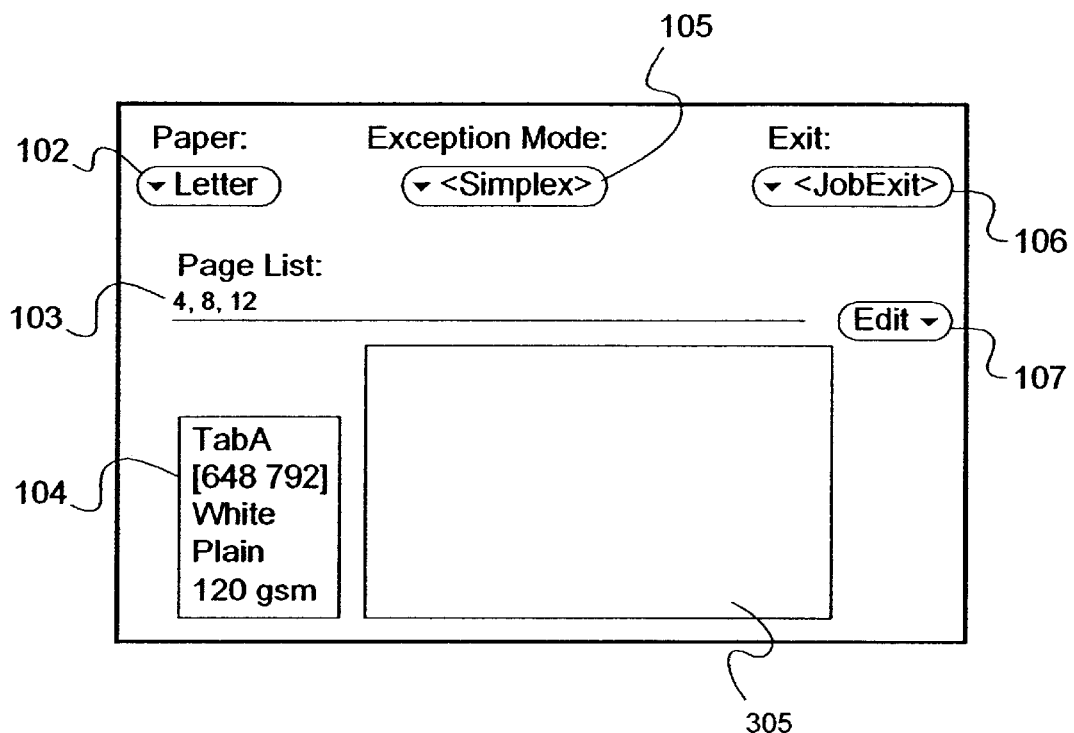
FIG. 11 is an illustrative screen of the user interface for making a print job request in accordance with the invention.

FIG. 11 shows an alternate screen of the user interface 13. The screen of FIG. 11 is similar to the screen of FIG. 5D. FIG. 11 replaces the "Exit" with the "Media Exit Pattern" 304. The "Media Exit Pattern" 304 features a "Define Pattern" pull-down menu. The "Define Pattern" menu may be displayed in an additional column of the display window 305. Like reference numbers in FIG. 5D and FIG. 11 indicate like elements or software features.

The designation of variables or printing control parameters, such as specific feed-request parameter, "<JobExit>", target adjustment, specific feed count, overall feed count, "route to Job Exit", specific request sum and overall request sum, are used for illustrative purposes and actual designations may be different while falling within the scope of the invention.

Figure 12:
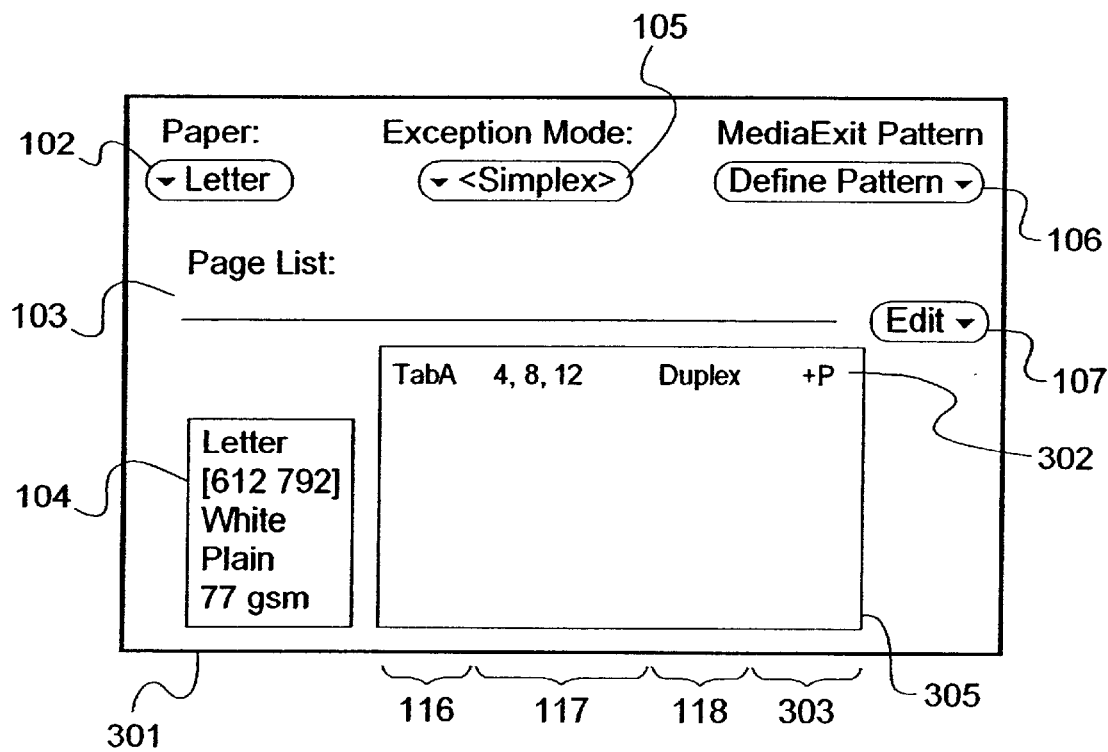
FIG. 12 is an illustrative screen of the user interface showing an example of job requests in accordance with the invention.

As shown in FIG. 12, one or more text lines 302 may appear in the text window 305. Like reference numbers in FIG. 11 and FIG. 12 indicate like elements. In the text window 305, one column 303 may show the "+P" which identifies the request as having a media exit pattern associated with it. To remove this pattern, the user can use the "Remove Pattern" from the pull down menu associated with the "Media Exit Pattern" 304. "Edit Pattern" allows changes to a previously established pattern.

In FIG. 12, the user has entered a page list on the page identifier list 103. They have selected media called "TabA" in pull-down menu associated with the media indicator 102. The attributes of the media are shown in text box 104. The user has selected "Simplex" in the pull-down menu associated with the exception mode indicator 105. The text box indicates that the user has asked for "TabA" media on three page numbers (e.g., 4, 8 and 12).

In one embodiment, the "Define Pattern" pull-down menu, associated with the media exit pattern 304, has three options: "Define Pattern", "Edit Pattern" and "Remove Pattern". As shown in FIG. 12, the media exit pattern 304 is set in "Define Pattern." "Define Pattern" brings up the screen shown in FIG. 13.

Figure 13:
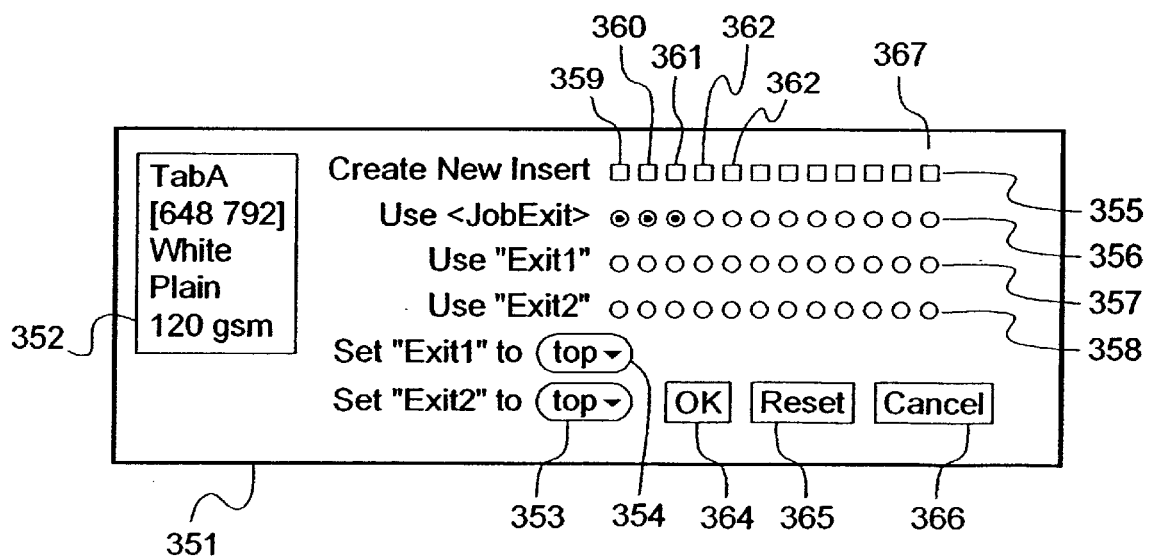
FIG. 13 is an illustrative screen of the user interface for making media pattern requests in accordance with the invention.

The screen of FIG. 13 supports a user's control of the printing procedure of the printing system 26 via the user interface 13. The screen 351 includes a series of electronic buttons that are arranged in columns (e.g., 359, 360, 361, 362 and 363) and rows (355, 356, 357, and 358). The rows (355, 356, 357, and 358) of the buttons are associated with the following functions: create new insert, use "<JobExit>", use "Exit 1", and use "Exit2". The columns of the buttons are associated with the positions of the pages in an output set of a print job. One column per page of the output set is preferably displayed in screen 35 or multiple affiliated screens. Here, as shown in FIG. 13, twelve pages per output set are supported, although in other embodiments the number of pages supported may be more or less than shown in FIG. 13. There could be as few as two columns, and there is no upper limit on the number of columns.

The first row 355, "Create New Insert" starts out with no check boxes checked as a default selection.

Figure 14:
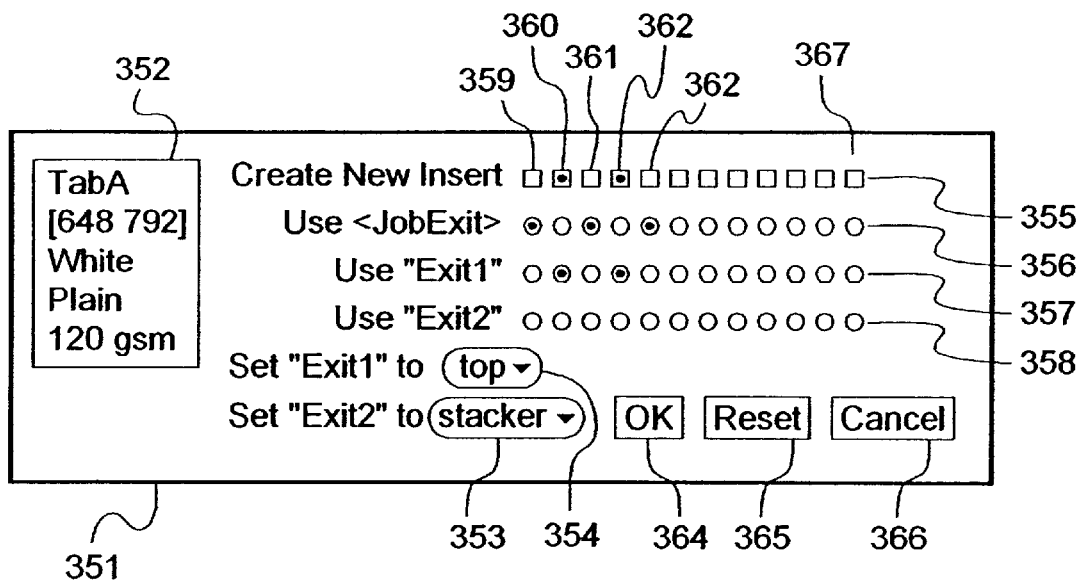
FIG. 14 is an illustrative screen of the user interface showing an example of media pattern requests in accordance with the invention.

In one example, shown in FIG. 14, the user checks the second and fourth check box in the "Create New Insert" row 355. When the printing system 26 prints an output set at print time, the printing system 26 assembles an output set with two unprinted "TabA" sheets added before page two and before page four. The user selects output destinations for the two unprinted "TabA" sheets as follows. First, the user clicks the button in the "Use Exit1" row 357 or another output destination and the second column 360. If the user clicks the "Use Exit1" row for the second column 360, the printing system 26 automatically turns off the button in the Use "<JobExit>" row for the second column 360 because a single indivisible sheet cannot be directed to multiple output destinations. Second, the printing system 26 selects or the user selects the button in the "Use Job Exit" row 356 or another output destination for the fourth column 362. The printing system 26 enforces the selection rule for the buttons that the row must always have the same number of selections as the number of times "TabA" has been requested for the job. Third, the user clicks the button in the "Use Exit1" row 357 for the fourth column 362. This automatically turns off the button in the "Use <JobExit>" row 356 and the fourth column 362. Fourth, the user selects or the printing system 26 selects the button in the "<Use JobExit" and the fourth column 362.

When the user selects the "OK" button 364 in FIG. 14, the selected media exit pattern is saved for the print job with the "TabA" media; the user interface 13 may revert to the screen of FIG. 11. The "Cancel" button 366 in FIG. 14 returns to the screen shown in FIG. 11 without selecting any print media pattern for the "TabA" media. The "Reset" button 365 in FIG. 14 restores the screen to the original state shown in FIG. 13 prior to the user making any entries.

The upper limit on the number of "Exit" rows (357 and 358) for display 22 is dependent on the number of exits available on the print engine 38 and supported by the printer 18.

The text box 352 describes the definition of the media. The screen 351 has "Set Exit1 to" and a "Set Exit2 to" which may be defined in accordance with pull-down menus. The pull-down menus associated with "Set Exit1 to" and a "Set Exit2 to" allow the user to define up to two exits (e.g., "Exit1" and "Exit2") in addition to the current "<JobExit>", although other embodiments may allow the definition of more or less exits. The number of exit names which populate these pull down menus are limited to the maximum number supported by the printer 18, rather than any inherent limitation of the software for the screen.

In an alternate embodiment, the "Set Exit1 to" and the "Set Exit2 to" menus may support the selection or assignment of a post-printing process or a post-feeding process for the "Exit1" and "Exit2", respectively. For example, a stapler or stapling station may be assigned to "Exit1" as a post-printing procedure.

When using ordered media within a print job, there may be instances where it is necessary to separate and/or dispose of unused sheets of the ordered media sets. For example, if the ordered media has a repeat pattern of five (for example, tabs that come in sets of five and only three of the five sheets in the ordered set are needed for a particular job, then there is a need for an arrangement to separate the unused media from the rest of the print job). In some prior art systems, the unused sheets of the ordered media are sent to an alternate exit. One feature of the present invention contemplates an automatic method and system for disposing of the unwanted media. In the system, the operator would use an interface, such as the graphical user interface 13, to select the ordered media that will not be used in a job. The graphic user interface 13 would provide an option on the display screen 22 such as "dispose" which the operator would use to initiate the separation function. The printing system 26 would be configured such that the print job is sent to one or more selected exits or trays and the unwanted sheets of the ordered media are directly sent to a 17 shredder connected to the printing system. The printing system has a path where the unwanted sheets travel to the shredder where the unwanted sheets would be shredded. This feature would minimize the handling of the unwanted sheets by the operator. Unlike prior art systems where the operator would need to physically remove the sheets from the particular exit where the unwanted sheets were sent by the printing system 22, with the present invention the unwanted sheets are automatically forwarded to the shredder 17 which disposes of the sheets by processing them through conventional shredding operations. Preferably, the graphical user interface 13 would also provide an indication on the display 22 indicating when the shredder 17 fills up. For example, a "full" message would be displayed on the screen 22 prompting the operator to empty the shredder bin.

This automatic feed to a shredder feature may also be used with some of the automatic jam discovery methods described above or with other jam recovery systems and systems.

The foregoing detailed description is merely illustrative of several physical embodiments of the invention. Physical variations of the invention, not fully described in the specification, may be encompassed within the purview of the claims. Accordingly, any narrower description of the elements in the specification should be used for general guidance, rather than to unduly restrict any broader descriptions of the elements in the following claims.

The following is claimed:

1. A printing system comprising:
   a first input source to store a first medium;
   a second input source to store at least one set of an ordered media, the set of ordered media comprising a plurality of sheets having different physical characteristics;
   a central processing unit (CPU) configured to store a graphical representation assigned to the sheets in the at least one set of ordered media as a part of a job ticket and upon the occurrence of a jam during printing to determine a correct sheet of the ordered media set to recover to and generate a graphical representation indicating the correct sheet to recover to; and
   a display to display the graphical representation indicating the correct sheet of the ordered media set.

2. The printing system of claim 1 further comprising:
   a scanner operatively connected to scan an image of the sheets in the set of ordered media and transmit the image to the CPU for storage therein; and
   wherein the CPU is configured to display an image of the correct sheet on the display.

3. The printing system of claim 2 wherein the CPU generates a thumbnail display of the sheets in the ordered media and highlights the correct sheet.

4. The printing system of claim 1 wherein the ordered media comprises tabs and the graphical representation comprises a representation of a correct tab to recover to.

5. A method of recovering from a jam in a printing system comprising:
   storing a first medium in a first input source;
   storing at least one set of an ordered media, the set of ordered media comprising a plurality of sheets having different physical characteristics, in a second input source;
   storing a graphical representation image of the sheets in the at least one set of ordered media as a part of a job ticket;
   upon the occurrence of a jam during printing to determining a correct sheet of the ordered media set to recover to and generating a graphical representation indicating the correct sheet to recover to; and
   displaying on a display the graphical representation indicating the correct sheet of the ordered media set.

6. The method of claim 5 further comprising:
   scanning an image of the sheets in the set of ordered media; and
   displaying an image on a display of the graphical representation indicating the correct sheet.

7. The method of claim 6 wherein the step of displaying comprises generating a thumbnail display of the sheets in the ordered media and highlighting the correct sheet.

8. The method of claim 5 wherein the ordered media comprises tabs and the step of generating a graphical representation comprises generating a representation of a correct tab to recover to.

* * * * *